Figure 1:
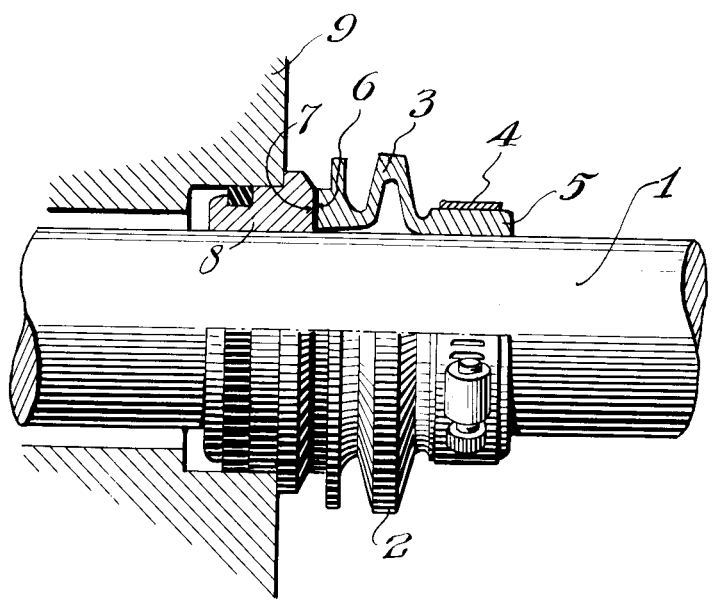

INVENTOR
Marcel Amblard

United States Patent Office 2,740,648
Patented Apr. 3, 1956

2,740,648

MECHANICAL BELLOWS SEAL

Marcel Amblard, Charleston, W. Va., assignor to E. I. du Pont de Nemours and Company, Wilmington, Del., a corporation of Delaware Application September 12, 1952, Serial No. 309,256

2 Claims. (Cl. 286—11)

This invention relates to improvements in devices for sealing rotary shafts, and more particularly it relates to improvements in the type of sealing device in which a rotating seal is in contact with a stationary seal. These sealing devices are generally referred to as mechanical seals (Chemical Engineering, May 1949, pages 129 and 132).

During the past decade numerous efforts have been made to develop improved mechanical seals which can be used effectively in pumps, compressors ad other apparatus for working water, oil, etc. Efforts also have been made to adapt such devices to other difficult service, such as the pumping of liquid gases, nitric acid and the like. In the latter service carbon rings could not be employed, because of attack by the acid. To overcome this difficulty certain plastic materials, notably polytetrafluoroethylene, were tried. These materials gave improved results, especially when suitable lubricants were employed to prevent unduly restraining the motion of the rotating members. An object of this invention is to provide further improvements in sealing devices for rotating shafts. A more particular object of this invention is to provide a mechanical seal having a fluid-tight contact which does not unduly restrain the motion of the rotating members.

According to one feature of the present invention there is provided a mechanical seal in which at least one seal ring is composed of a tough plastic material, preferably having a wearing face of an anti-friction, strengthening or hardening material such as graphite. Another feature of the invention provides a bellows type seal of a plastic material with or without a seal surface, and more particularly such a seal of polytetrafluoroethylene containing a graphite or similar anti-friction contact face.

The invention more particularly illustrated by the drawing is a bellows type of seal constructed of a thermoplastic material and used to prevent, for example, the leakage of a fluid around a rotating shaft. The seal is in the form of a collar that surrounds the shaft and is so constructed that at one extremity it can be shrunk to fit fluid-tightly around the shaft and at the other extremity it is provided with an optically ground face which rotates against a similar face of a stationary sealing ring within which the shaft rotates.

Figure 2:
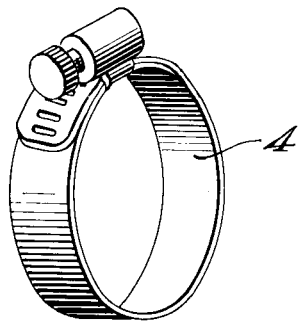

The invention will be more readily appreciated by reference to the attached drawing in which Figure 1 shows an assemblage of a mechanical bellows seal partially in section. Figure 2 is a detail of a common type of clamping device used for clamping the seal to the shaft.

The seal 2 is illustrated in Figure 1 and is of a bellows type which may have one or a plurality of convolutions 3. The seal, which is in the form of a cylinder, is slipped over an end of the shaft 1 and clamped in the proper position by clamping device 4, positioned about the collar 5. As the shaft rotates in its bearings, not shown, and as the seal is clamped to the shaft, the seal rotates with the rotation of the shaft. A bearing face 6 is provided, separated from the collar 5 by convolutions 3. The bearing face 6 is in contact with a stationary ring seal face 7. The ring seal 8 is fixed to a housing 9 or other part of the apparatus in which the shaft rotates. The stationary seal 8 and/or its face 7 may be of any suitable type of material and preferably constructed of solid brass, bronze or an alloy steel faced, if desired, with a friction resisting face. The shaft rotates freely inside the housing 9 and seal 8, fluids within the apparatus being prevented from passing beyond the stationary seal 8 because of the rotating bellows seal 2 and more particularly its rotating face 6 which meets the stationary face of the stationary seal 8 and also because of the fluid-tight collar 5. To insure a tight seal the stationary and rotating faces 6 and 7 are preferably ground optically flat. The adjustment of the bellows type seal by positioning the collar 5 on the shaft permits, by contraction or expansion of the convolutions 3 of the bellows, a proper tension between the faces to prevent, on the one hand, fluid leakage and, on the other, too great friction between the rotating and the stationary surfaces. In many adaptations of the device no housing need surround the bellows seal 2, except to provide dust free operation. In those operations, however, in which excessively high pressures are employed, it is often desirable to confine the external diameter of the convolutions 3 of the bellows within fairly narrow limits in order that the clamping ring 4 may apply the desirable high degree of pressure needed to maintain an absolute seal between the rotating face 6 of the seal 2 and the stationary face 7 of the stationary seal 8.

The seal is preferably constructed either by molding, machining or otherwise making the bellows and collar of the seal of a resilient thermoplastic material. The resiliency of the plastic should be as permanent as possible and the material resistant to the fluid being sealed.

In practicing a preferred form of the present invention the plastic is polytetrafluoroethylene with a face 6 of any suitable anti-friction, strengthening or hardening material such as graphite, a mixture of graphite and polytetrafluoroethylene, a mixture of Carborundum and graphite, a mixture of graphite, zircon and tetrafluoroethylene and the like, the friction resisting material and the polytetrafluoroethylene being intimately admixed. To accomplish this mixing it is desirable that the polytetrafluoroethylene, prior to blending with the graphite, zircon, Carborundum or other anti-friction material, be in the form of very fine particles. Also, the anti-friction material should be in a very fine state of subdivision, i. e. for example, in the form of finely ground powder. Such mixtures can be molded under pressure, or extruded with the aid of hydrocarbon lubricants, as disclosed in copending application S. N. 171,534, now Patent No. 2,685,707, dated August 10, 1954. After extrusion, the shaped rings should be heated at a temperature above 327° C., preferably about 327° to 450° C. to sinter the polytetrafluoroethylene.

The term "polytetrafluoroethylene" as employed herein means a tetrafluoroethylene polymer in which the sole polymerizable component is tetrafluoroethylene.

The quantity of anti-friction material which should be blended with polytetrafluoroethylene in making the sealing rings of this invention depends in part upon the service to which the rings are to be put. For certain purposes it is preferable to employ mixtures in which the quantity of the anti-friction material does not exceed about 50% of the weight of the blend. In general, it is relatively difficult to obtain uniform blends of granular polytetrafluoroethylene and the anti-friction material when the amount of the latter is very high; however, rings containing upwards of 90% by weight may be employed in the mechanical sealing elements described herein.

The bellows of the seal, as well as the collar 5, are constructed of plastic material which may be composed of any suitable resilient, preferably thermoplastic, material that can be formed by molding processes such as injection molding or can be shaped by any other suitable process. Such materials include, for example, and in addition to those already described, solid polymers of ethylene, polyhexamethylene adipamide, polyhexamethylene sebacamide, the cellulose derivatives, such as cellulose acetate, cellulose nitrate, cellulose aceto-butyrate and the like; polyvinyl acetals, including polyvinyl formal and polyvinyl butyral, etc., and polymeric:vinyl ketones, vinyl chloride, vinyl acetate, acrylates, methacrylates and similar thermoplastic materials or mixtures thereof.

The sealing bellows of the invention may be used for sealing such fluids as volatile liquid hydrocarbons, chlorinated solvents, acids, alkalies and the like. Other uses include sealing the driving shafts of ships, small craft, stirring units for chemical reaction vessels, pumps, compressors for chemical gases, etc.

I claim:

1. A mechanical seal for rotating shafts of the class described, comprising in combination a bellows seal composed of polytetrafluoroethylene and having at least one convolution of the bellows integral with a collar and seal face, said seal being adapted and arranged for surrounding and rotating with a shaft to be sealed, said seal having a collar at one extremity of greater internal diameter than the shaft to be sealed, a clamp for shrinking the collar and positioning it on the shaft, a face at the other extremity of the seal of an anti-frictional material in contiguity with the polytetrafluoroethylene for contacting with a stationary seal face, anti-frictional material being uniformly blended with and into the polytetrafluoroethylene, said face being separated by at least one convolution from the collar.

2. A mechanical seal for rotating shafts of the class described, comprising in combination a bellows seal composed of polytetrafluoroethylene and having at least one convolution of the bellows integral with a collar and seal face, said seal being adapted and arranged for surrounding and rotating with a shaft to be sealed, said seal having a collar at one extremity of greater internal diameter than the shaft to be sealed, a clamp for shrinking the collar and positioning it on the shaft, a graphite face at the other extremity of the seal in contiguity with the polytetrafluoroethylene for contacting with a stationary seal face, said graphite face being uniformly blended with and into the polytetrafluoroethylene of the seal, said face being separated by the convolution from the collar.

References Cited in the file of this patent

UNITED STATES PATENTS

| | | |
|---|---|---|
| 1,292,197 | Williams | Jan. 21, 1919 |
| 1,632,562 | Rolaff | June 14, 1927 |
| 1,931,723 | Fageol et al. | Oct. 24, 1933 |
| 2,108,701 | Amberg | Feb. 17, 1938 |
| 2,337,639 | Brummer | Dec. 28, 1943 |
| 2,467,312 | Jack | Apr. 12, 1949 |
| 2,567,527 | Parks | Sept. 11, 1951 |

FOREIGN PATENTS

| | | |
|---|---|---|
| 574,619 | Great Britain | Jan. 14, 1946 |

OTHER REFERENCES

Product Engineering—Nov. 1947.